(12) United States Patent
Breen et al.

(10) Patent No.: US 10,730,099 B2
(45) Date of Patent: *Aug. 4, 2020

(54) MODULAR PILOT ASSEMBLY WITH SELF-CONTAINED STRIPPER AND METHOD FOR METAL FORMING DIES

(71) Applicant: STANDARD LIFTERS, INC., Grand Rapids, MI (US)

(72) Inventors: Scott M. Breen, Marne, MI (US); Joel T. Pyper, Grand Rapids, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 275 days.

This patent is subject to a terminal disclaimer.

(21) Appl. No.: 15/874,971

(22) Filed: Jan. 19, 2018

(65) Prior Publication Data

US 2018/0141106 A1 May 24, 2018

Related U.S. Application Data

(63) Continuation of application No. 14/845,344, filed on Sep. 4, 2015, now Pat. No. 9,895,740, which is a
(Continued)

(51) Int. Cl.
*B21D 43/06* (2006.01)
*B21J 13/08* (2006.01)
(Continued)

(52) U.S. Cl.
CPC .............. *B21J 13/08* (2013.01); *B21D 37/08* (2013.01); *B21D 43/06* (2013.01); *B21J 13/02* (2013.01);
(Continued)

(58) Field of Classification Search
CPC ...... B21D 37/08; B21D 43/02; B21D 43/027; B21D 43/04; B21D 43/05; B21D 43/06;
(Continued)

(56) References Cited

U.S. PATENT DOCUMENTS 2,168,377 A 8/1939 Wales
4,326,402 A * 4/1982 Wallis .................... B21D 37/08
72/420
(Continued)

FOREIGN PATENT DOCUMENTS

JP 56084130 9/1981
JP 56122634 9/1981
(Continued)

OTHER PUBLICATIONS

Standard Lifters Inc., "Pilot Assembly," sales brochure, publication date Oct. 2011, 15 pages total, Grand Rapids, Michigan USA.
(Continued)

*Primary Examiner* — Edward T Tolan
(74) *Attorney, Agent, or Firm* — Price Heneveld LLP

(57) ABSTRACT

A pilot assembly and method has a cylindrical pilot body with a tapered outer end, a grooved inner end, and a central portion with at least one inwardly curved side wall relief, as well as internally mounted reciprocating ejector pins with outer ends that protrude through holes in the outer body end to strip stock from the pilot. A spring has its outer end mounted in the groove in the outer body end, and an inner end attached to the inner body end in a pre-tensed condition. A cap screw has an enlarged head that has at least a portion thereof fit into the pilot sidewall relief, and a threaded shank that anchors the pilot in an associated die member.

20 Claims, 5 Drawing Sheets

Related U.S. Application Data continuation of application No. 13/545,202, filed on Jul. 10, 2012, now Pat. No. 9,138,799.

(60) Provisional application No. 61/547,785, filed on Oct. 17, 2011.

(51) Int. Cl.
*B21D 37/08* (2006.01)
*B21J 13/02* (2006.01)
*B21J 13/14* (2006.01)
*B23P 15/24* (2006.01)
*B21D 45/06* (2006.01)
*B21D 45/00* (2006.01)
*B21D 43/05* (2006.01)

(52) U.S. Cl.
CPC ............... *B21J 13/14* (2013.01); *B23P 15/24* (2013.01); *B21D 43/05* (2013.01); *B21D 45/006* (2013.01); *B21D 45/06* (2013.01)

(58) Field of Classification Search
CPC .... B21D 45/003; B21D 45/006; B21D 45/06; B21D 45/10; B21J 13/08
See application file for complete search history.

(56) References Cited

U.S. PATENT DOCUMENTS

| | | |
|---|---|---|
| 4,342,214 A | 8/1982 | Neuendorf |
| 4,644,836 A | 2/1987 | Wepner |
| 4,916,931 A | 4/1990 | Kaeseler |
| 4,945,749 A | 8/1990 | Walker et al. |
| 4,993,295 A | 2/1991 | Dacey, Jr. |
| 5,722,280 A | 3/1998 | Bodnar |
| 5,860,315 A | 1/1999 | Sawdon |
| 7,694,399 B2 | 4/2010 | Sawdon et al. |
| 8,950,233 B2 | 2/2015 | Pyper et al. |
| 9,289,815 B2 | 3/2016 | Breen et al. |
| 9,469,043 B2 | 10/2016 | Sugizaki et al. |
| 9,895,740 B2 * | 2/2018 | Breen .................. B21D 37/08 |
| 10,406,585 B2 * | 9/2019 | Pyper .................. B21D 43/06 |
| 2006/0193937 A1 | 8/2006 | Gakovic |
| 2009/0193865 A1 | 8/2009 | Pyper et al. |

FOREIGN PATENT DOCUMENTS

| | | |
|---|---|---|
| JP | 57100825 | 6/1982 |
| JP | 06142788 | 5/1994 |
| KR | 1020010069897 | 7/2001 |
| KR | 1020060104028 | 10/2006 |
| KR | 100766072 | 10/2007 |

OTHER PUBLICATIONS

Standard Lifters,Inc., "Pilot Sleeve," sales brochure, publication date Jan. 2012, 18 pages total, Grand Rapids, Michigan.

Fibro Inc., "Pilot Units to Daimler Standard," catalog, p. E72, publication date unknown, 1 page total Rockford, Illinois USA.

Dayton Progress Corporation, "Regular Pilots," catalog, pp. 9, 11, 13, publication date unknown, 3 pages total, Dayton, Ohio USA.

Ajacs Die Sales Corporation, "Pilot Retainer," sales brochure, publication date unknown, 2 pages total, Grand Rapids, Michigan USA.

Misumi Corporation, "Pilot Punches," catalog, pp. 202, 220, 228, 234, 242, 946, and 948, publication date unknown, 7 pages total, Schaumburg, Illinois USA.

Modern Die Systems Inc., "Die Accessories," sales brochure, publication date unknown, 1 page total, Ellwood, Indiana USA.

* cited by examiner

U.S. Patent Aug. 4, 2020 Sheet 1 of 5 US 10,730,099 B2
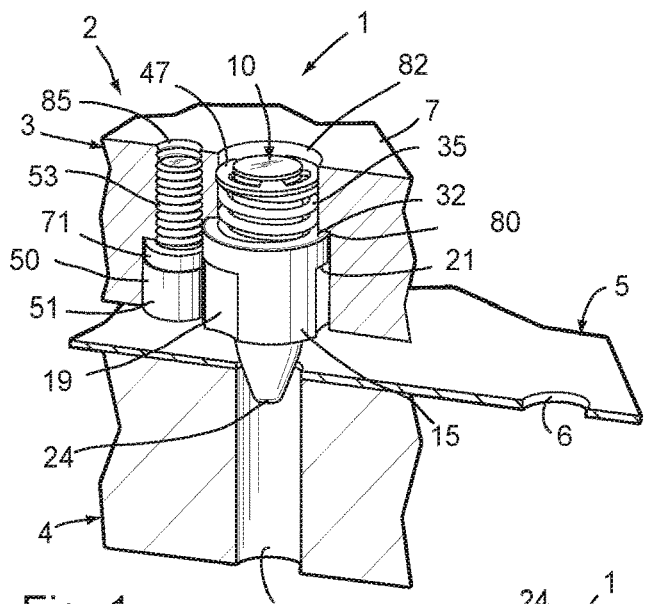
Fig. 1
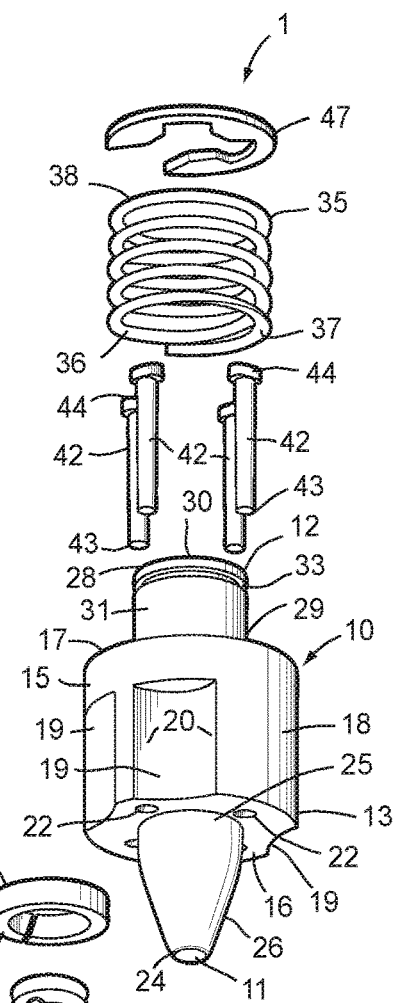
Fig. 2
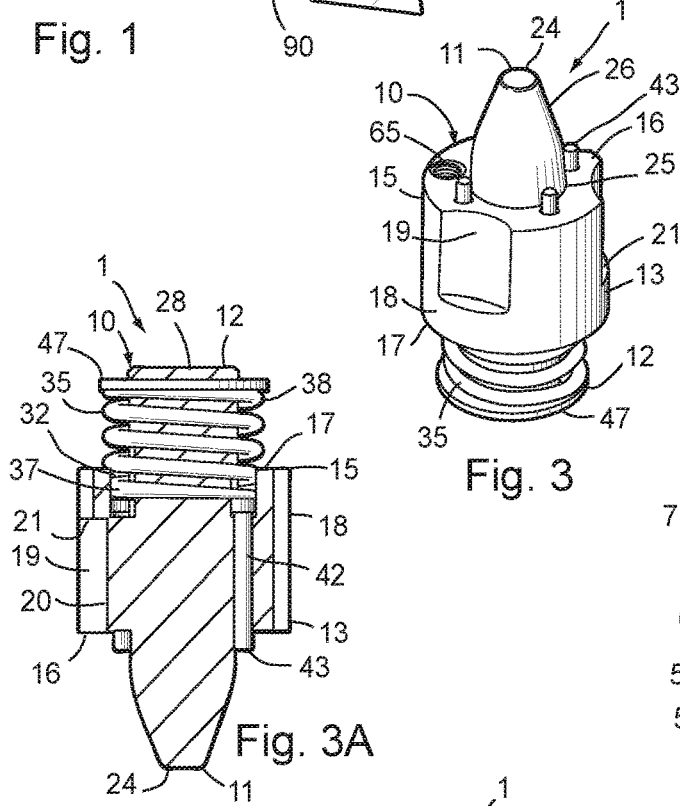
Fig. 3
Fig. 3A
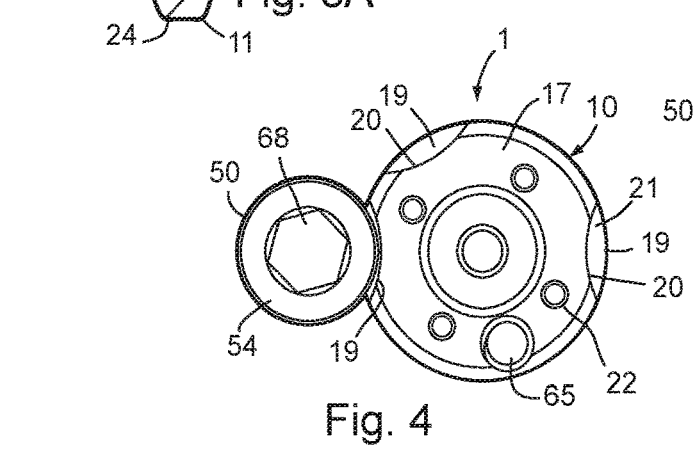
Fig. 4

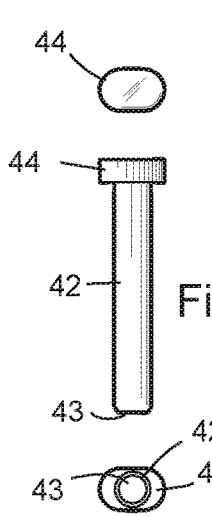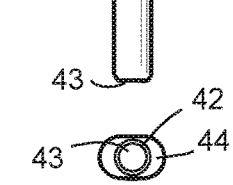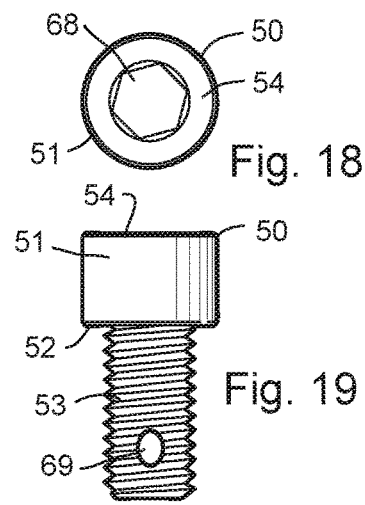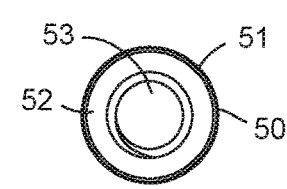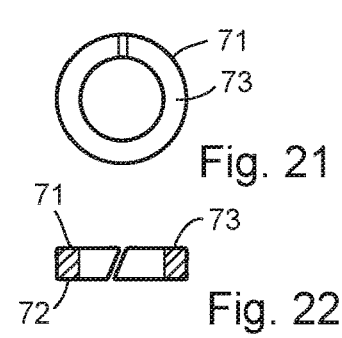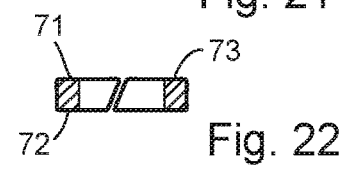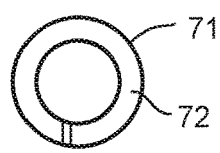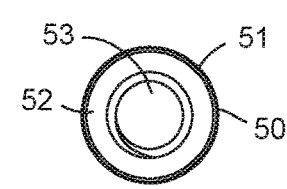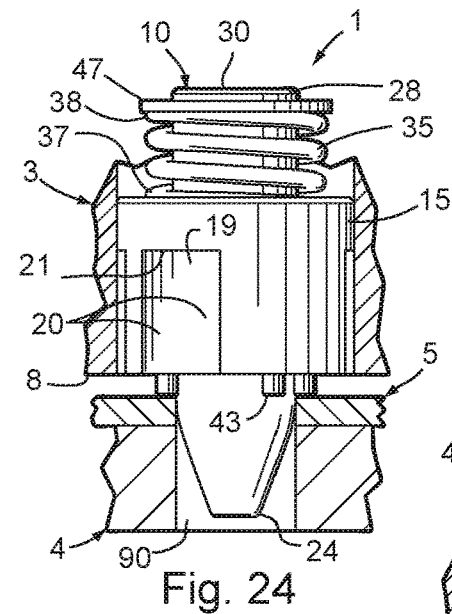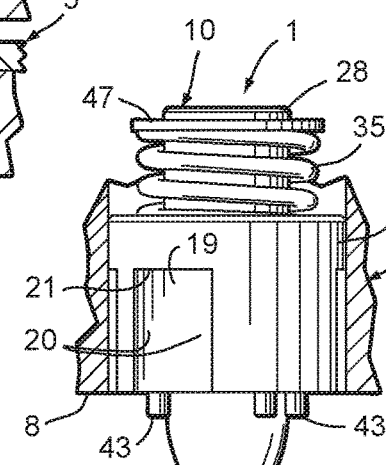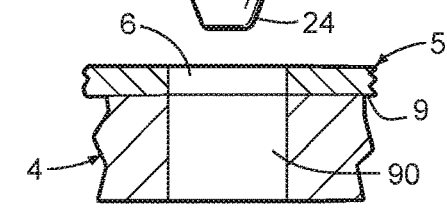

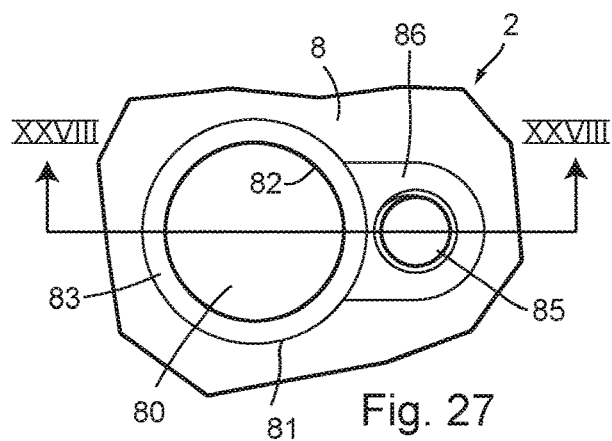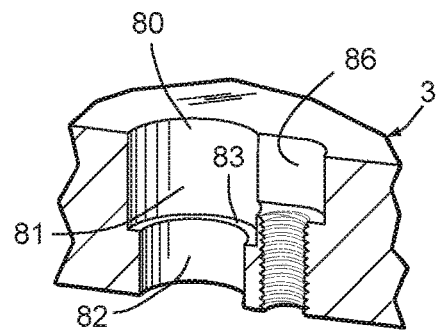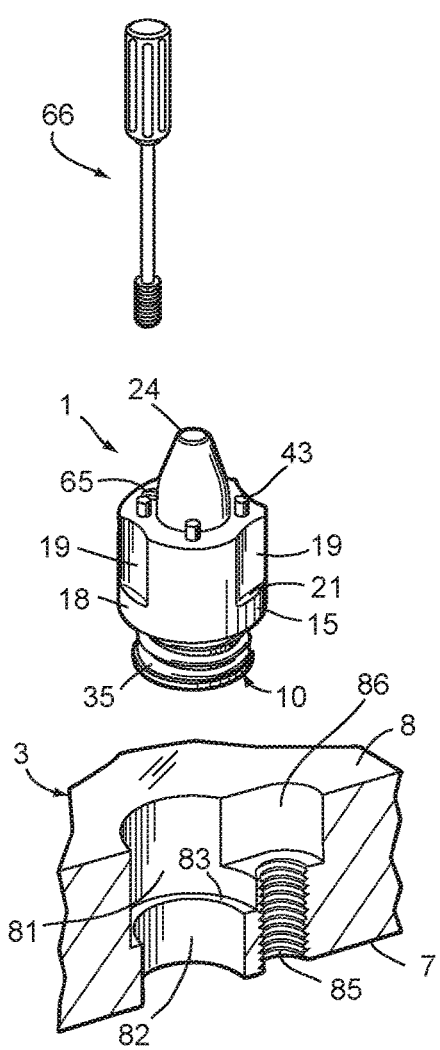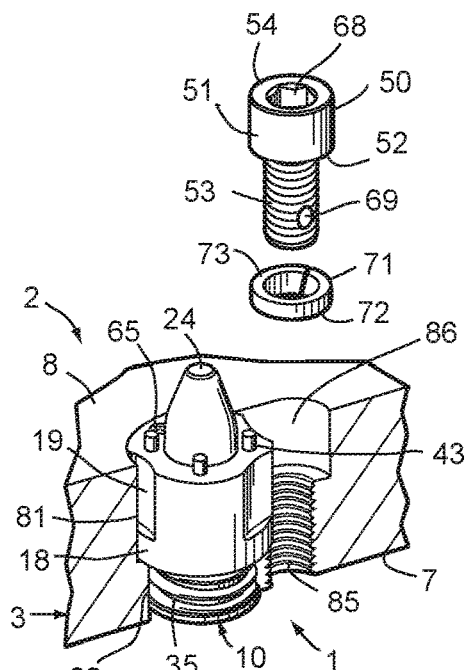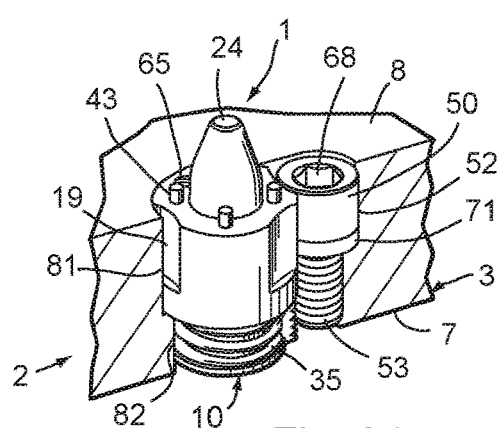
Fig. 27
Fig. 28
Fig. 29
Fig. 30
Fig. 31

MODULAR PILOT ASSEMBLY WITH SELF-CONTAINED STRIPPER AND METHOD FOR METAL FORMING DIES

CROSS REFERENCE TO RELATED APPLICATIONS AND CLAIM TO PRIORITY

The present application is a continuation of and claims priority under 35 U.S.C. § 120 to commonly assigned U.S. Pat. No. 9,895,740, issued Feb. 20, 2018, entitled MODULAR POILOT ASSEMBLY WITH SELF-CONTAINED STRIPPER AND METHOD FOR METAL FORMING DIES, which claims the priority under 35 U.S.C. § 120 to U.S. Pat. No. 9,138,799, issued Sep. 22, 2015, entitled MODULAR PILOT ASSEMBLY WITH SELF-CONTAINED STRIPPER AND METHOD FOR METAL FORMING DIES, which claims the priority benefit under 35 U.S.C. § 119 to U.S. provisional patent application No. 61/547,785, filed Oct. 17, 2011, entitled PILOT ASSEMBLY AND METHOD FOR METAL FORMING DIES AND THE LIKE, both of which are incorporated herein by reference, as well as U.S. Pat. No. 9,289,815, issued Mar. 22, 2016, entitled MODULAR PILOT ASSEMBLY WITH SELF-CONTAINED STRIPPER AND METHOD FOR METAL FORMING DIES, which is also incorporated herein by reference.

BACKGROUND OF THE INVENTION

The present invention relates to metal forming dies and the like, and in particular to a modular pilot assembly with self-contained stripper and associated method.

Metal forming dies, such as stamping dies and the like, are well known in the art.

Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming processes have typically been individually designed, one of a kind assemblies for a particular part, with each of the various components being handcrafted and custom mounted or fitted in an associated die set, which is in turn positioned in a stamping press. Not only are the punches and the other forming tools in the die set individually designed and constructed, but the other parts of the die set, such as stock lifters, guides, end caps and keepers, cam returns, pilots, etc. are also custom designed, and installed in the die set. Current die making processes require carefully machined, precision holes and recesses in the die set for mounting the individual components, such that the same are quite labor intensive, and require substantial lead time to make, test and set up in a stamping press. Consequently, such metal forming dies are very expensive to design, manufacture, and repair or modify.

Pilot assemblies, such as that disclosed in U.S. Pat. No. 4,342,214, are used for locating a work piece in successive forming stages of a machine, such as a punch press, where the work piece is progressively moved through the forming stages of the machine. The pilot assembly typically includes a pilot pin mounted to a movable die member of the machine for guiding entry into a previously formed hole in a work piece or in a companion die member as the die members are moved toward each other.

FIGS. 5-8 illustrate several well-known prior art metal forming dies and associated pilot mechanisms, which further represent the background of the present invention. For example, FIG. 5 illustrates one half of a die set 100, which includes a first die member 101 having a plurality of longitudinally spaced apart work stations 102 at which various bending, forming, cut-off and/or punching operations are performed on an elongate strip of metal stock 103. As best illustrated in FIG. 6, the prior art pilot mechanism 104 for the illustrated die set 100 includes a pierce tool punch 105 located at an upstream portion of stock strip 103, which, in the illustrated example, forms a vertically oriented through hole 106 in the stock strip 103 at regularly spaced apart intervals along the stock strip. The through holes or pilot holes 106 are selectively engaged by a series of pilot pins 107 positioned on at least selected ones of the die work stations 102, which serve to precisely locate the stock strip 103 in the work stations, and retain the same in place during the metal forming stroke of the die tools. After each metal forming stroke of the die tools, the pilot pins 107 are retracted out of their associated pilot holes 106 in the stock strip 103, and the stock strip is then shifted longitudinally to the next adjacent work station 102, until the metal part has been completely formed and cut off of the stock strip. When the pilot pins 107 are retracted out of the pilot holes 106 in the stock strip 103, the stock strip tends to stick on one or more of the pilot pins, thereby requiring some type of stripper mechanism to separate them, such that the stock strip can be quickly and sequentially advanced longitudinally through the various die stations.

FIG. 7 illustrates another known prior art pilot assembly that includes a rectangularly shaped block or base 111 that is mounted in a blind hole pocket 112 in an associated upper die member 113. The base block 111 includes a central aperture 114 in which a pilot pin 115 is retained, and two laterally offset reaction apertures 116 in which a pair of stripper assemblies are received and retained. A female punch tool 117 is positioned in the lower die member 122, and closely receives the pilot pin 115 to precisely locate the stock strip 5 in the associated work station 112. Each of the stripper assemblies comprises a plunger shaped rod 118 having an outer end 119 protruding outwardly from base block 111 toward the stock strip 103, and an inner end 120 with a coil spring 121 received thereover which resiliently urges the rods 118 outwardly on opposite sides of pilot pin 15, and serve to strip the stock strip 103 from the exterior surface of the pilot pin 115 as the pilot pin and associated upper die member 113 are raised to a diverged condition relative to the lower die member 122.

FIG. 8 illustrates yet another known prior art pilot assembly, which includes an enlarged, flat mounting plate 126 which attaches to the upper surface 127 of the upper die member 113 using a pair of cap head screws 128 having threaded shanks 129 that are anchored in the upper die member 113. The upper die member 113 includes a central aperture 114 in which a pilot pin 115 is received and retained, along with a pair of reaction apertures 116 disposed on opposite sides of pilot pin 115, each of which receives and retains therein a plunger shaped rod 118. The outer ends 119 of the rods 118 protrude outwardly from the lower surface of upper die member 113, while the inner ends 120 of rods 118 have coil springs 121 received thereon which resiliently urge rods 118 outwardly, such that the outer ends 119 of rods 118 serve to strip the stock strip 5 away from the exterior surface of the pilot pin 115, and thereby permit the stock strip 5 to be shifted longitudinally into the next adjacent work station.

While such prior pilot assemblies have proven generally successful, they are rather expensive and time consuming to construct and install in an associated die set, such that further improvements and enhancements to the same, as well as metal forming dies generally, would be clearly advantageous, and are disclosed herein.

SUMMARY OF THE INVENTION

One aspect of the present invention is a multi-station progressive metal forming die having at least two mutually converging and diverging die members between which an elongate stock strip is shifted longitudinally to form parts from the stock strip, the improvement of a modular pilot assembly with self-contained stripper, comprising:

a pilot operably supported on one of the die members and having an outer end oriented toward the stock strip, an oppositely disposed inner end oriented away from the stock strip, and a medial portion disposed axially between the outer and inner ends, and including:

a generally cylindrically shaped body portion disposed at the medial portion of the pilot, having a generally closed outer end oriented toward the stock strip, a generally open inner end oriented away from the stock strip, and an outer sidewall with a least one fastener relief therein having an arcuately shaped, radially inwardly curved relief sidewall that extends from the closed outer end to a generally flat arcuately shaped relief end surface facing toward the stock strip and spaced axially a predetermined distance from the open inner end, as well as at least one axially extending ejector pin aperture which opens through the closed outer end and into the open inner end;

a generally tapered point portion disposed at the outer end of the pilot, having a circularly shaped innermost collar portion disposed adjacent the closed outer end of the body portion shaped for close reception in a pilot hole in the stock strip, and a generally frusto-conically shaped outer portion configured to engage the pilot hole in the stock strip and guide the same to a predetermined position in an associated die forming station;

a generally cylindrically shaped spring retainer rod portion disposed at the inner end of the pilot, having an outer end oriented toward the stock strip, an inner end oriented away from the stock strip, and an outer sidewall with a diameter that is less than the diameter of the outer sidewall of the body portion, thereby forming an annularly shaped spring groove adjacent the outer end of the spring retainer rod portion, as well as a retainer groove disposed adjacent the inner end of the spring retainer rod portion;

a spring member having a generally hollow interior that is received onto and over the spring retainer rod portion of the pilot, an outer end oriented toward the stock strip and received in the spring groove, and an opposite inner end oriented away from the stock strip and positioned adjacent to the retainer groove in the spring retainer rod portion;

at least one rigid ejector pin slidingly received and retained in the ejector pin aperture in the body portion, having an outer end that protrudes outwardly from the closed outer end of the body portion when urged to an extended condition to contact the stock strip and strip the same away from the pilot, and retracts toward the body portion when urged to a retracted position, and an inner end that operably engages the outer end of the spring member and is thereby biased outwardly by the spring member toward the extended condition;

a retainer ring detachably received in the retainer groove in the spring retainer rod portion and engaging the inner end of the spring member in a pre-tensed condition to bias the ejector pin toward the extended condition; and a mounting screw having an enlarged head portion with a circular plan shape that is at least partially, closely received in the fastener relief in the body portion, an annularly shaped inner face oriented away from the stock strip and abuttingly engaging the relief end surface of the fastener relief in the body portion, and a threaded shank portion anchored in the one die member to securely, yet detachably mount the pilot assembly on the one die member in a manner which causes the ejector pin to automatically reciprocate between the retracted and extended positions relative to the body portion of the pilot during operation of the metal forming die to insure that the stock strip is consistently stripped away from the pilot.

Yet another aspect of the present invention is a A modular pilot assembly with self-contained stripper for multi-station progressive metal forming dies having at least two mutually converging and diverging die members between which an elongate stock strip is shifted longitudinally to form parts from the stock strip, comprising:

a pilot configured for operable support on an associated die member, and having an outer end oriented toward the stock strip, an oppositely disposed inner end oriented away from the stock strip, and a medial portion disposed axially between the outer and inner ends, and including:

a generally cylindrically shaped body portion disposed at the medial portion of the pilot, having a generally closed outer end oriented toward the stock strip, a generally open inner end oriented away from the stock strip, and an outer sidewall with a least one fastener relief therein having an arcuately shaped, radially inwardly curved relief sidewall that extends from the closed outer end to a generally flat, arcuately shaped relief end surface facing toward the stock strip and spaced axially a predetermined distance from the open inner end, as well as at least one axially extending ejector pin aperture which opens through the closed outer end and into the open inner end;

a generally tapered point portion disposed at the outer end of the pilot, having a circularly shaped innermost collar portion disposed adjacent the closed outer end of the body portion, shaped for close reception in a pilot hole in the stock strip, and a generally frusto-conically shaped outer portion configured to engage the pilot hole in the stock strip and guide the same to a predetermined position in an associated die forming station;

a generally cylindrically shaped spring retainer rod portion disposed at the inner end of the pilot, having an outer end oriented toward the stock strip, an inner end oriented away from the stock strip, and an outer sidewall with a diameter that is less than the diameter of the outer sidewall of the body portion, thereby forming an annularly shaped spring groove adjacent the outer end of the spring retainer rod portion, and including a retainer groove disposed adjacent the inner end of the spring retainer rod portion;

a spring member having a generally hollow interior received on and over the spring retainer rod portion of the pilot, an outer end oriented toward the stock strip and received in the spring groove, and an opposite inner end oriented away from the stock strip and positioned adjacent to the retainer groove in the spring retainer rod portion;

at least one rigid ejector pin slidingly received and retained in the ejector pin aperture in the body portion, having an outer end that protrudes outwardly from the closed outer end of the body portion when urged to an extended condition to abut the stock strip and strip the same away from the pilot, and retracts toward the body portion when urged to a retracted position, and an inner end that operably engages the outer end of the spring member and is thereby biased outwardly by the spring member toward the extended condition;

a retainer ring detachably received in the retainer groove in the spring retainer rod portion and engaging the inner end of the spring member in a pre-tensed condition to bias the ejector pin toward the extended condition; and a mounting screw having an enlarged head portion with a circular plan shape that is at least partially, closely received in the fastener relief in the body portion, an annularly shaped inner face oriented away from the stock strip and abuttingly engaging the relief end surface of the fastener relief in the body portion, and a threaded shank portion configured for anchoring in an associated die member to securely, yet detachably mount the pilot assembly on the associated die member in a manner which causes the ejector pin to automatically reciprocate between the retracted and extended positions relative to the body portion of the pilot during operation of the metal forming die to insure that the stock strip is consistently stripped away from the pilot.

Yet another aspect of the present invention is a method for making a multi-station progressive metal forming die having at least two mutually converging and diverging die members between which an elongate stock strip is shifted longitudinally to form parts from the stock strip, with the improvement of at least one modular pilot with self-contained stripper for precisely locating the stock strip in the die stations, comprising:

forming a generally cylindrically shaped body portion on a medial portion of the pilot with a generally closed outer end oriented toward the stock strip, a generally open inner end oriented away from the stock strip, and an outer sidewall with a least one fastener relief therein having an arcuately shaped, radially inwardly curved relief sidewall that extends from the closed outer end to a generally flat, arcuately shaped relief end surface facing toward the stock strip and spaced axially a predetermined distance from the open inner end, as well as at least one axially extending ejector pin aperture which opens through the closed outer end and into the open inner end;

forming a generally tapered point portion on an outer end of the pilot with a circularly shaped innermost collar portion disposed adjacent the closed outer end of the body portion shaped for close reception in a pilot hole in the stock strip, and a generally frusto-conically shaped outer portion configured to engage the pilot hole in the stock strip and guide the same to a predetermined position in an associated die forming station;

forming a generally cylindrically shaped spring retainer rod portion on an inner end of the pilot with an outer end oriented toward the stock strip, an inner end oriented away from the stock strip, and an outer sidewall with a diameter that is less than the diameter of the outer sidewall of the body portion, thereby forming an annularly shaped spring groove adjacent the outer end of the spring retainer rod portion, as well as a retainer groove disposed adjacent the inner end of the spring retainer rod portion;

forming at least one rigid ejector pin with an inner end, and an outer end configured to protrude outwardly from the closed outer end of the body portion when urged to an extended position to contact the stock strip, and to retract toward the body portion when urged to a retracted position;

inserting the ejector pin into the ejector pin aperture in the body portion of the pilot, such that the ejector pin is slidingly received and retained in the ejector pin aperture for longitudinal reciprocation therein between the extended and retracted positions;

selecting a spring member with a generally hollow interior, an outer end oriented toward the stock strip, and an opposite inner end oriented away from the stock strip;

positioning the hollow interior of the spring member onto and over the spring retainer rod portion of the pilot, with the outer end of the spring member received in the spring groove and abutting the inner end of the ejector pin, and the inner end of the spring member positioned adjacent to the retainer groove in the spring retainer rod portion;

shifting the inner end of the spring member outwardly along the spring retainer rod portion of the pilot to compress the spring member to a pre-tensed condition, such that the outer end of the spring member operably engages the inner end of the ejector pin and biases the ejector pin to the extended position;

installing a retainer ring in the retainer groove in the spring retainer rod portion with the spring member in the pre-tensed condition, such that the retainer ring abuttingly engages the inner end of the spring member and retains the spring member in the pre-tensed condition on the spring retainer rod portion of the pilot, thereby resiliently urging the ejector pin to the normally extended position;

forming a non-threaded pilot aperture in a mounting face of one of the die members with a shape to closely receive and retain the body portion of the pilot therein;

forming a threaded mounting screw aperture in the mounting face of the one die member at a location spaced laterally apart from the pilot aperture a predetermined distance;

inserting the pilot into the pilot aperture in the one die member with the outer sidewall of the body portion of the pilot closely received therein, and with the fastener relief in the body portion of the pilot facing and aligned with the mounting screw aperture in the one die member, so as to accurately locate the pilot on the one die member;

selecting a mounting screw having an enlarged head portion with a circular plan shape sized for at least a portion thereof to be closely received in the fastener relief in the body portion of the pilot, an annularly shaped inner face sized for abutting engagement with at least a portion of the relief end surface of the fastener relief in the body portion of the pilot, and a threaded shank portion;

inserting the threaded shank portion of the mounting screw axially into the mounting screw aperture in the mounting face of the one die member, such that at least a portion of the enlarged head portion of the mounting screw is closely received in the fastener relief and adjacent the relief sidewall on the body portion of the pilot; and tightening the mounting screw in the mounting screw aperture in the one die member, thereby abuttingly engaging at least a portion of the inner face of the mounting screw head portion securely against the relief end surface of the fastener relief in the body portion of the pilot to securely, yet detachably mount the pilot assembly on the one die member in a manner which causes the ejector pin to automatically reciprocate between the retracted and extended positions relative to the body portion of the pilot during operation of the metal forming die to insure that the stock strip is consistently stripped away from the pilot.

Yet another aspect of the present invention is a pilot assembly that can be easily installed in an associated die member by simple machining a single pocket and a single tapped retainer hole therein. The pilot assembly has a self-contained stripper with no loose parts or pieces, is constructed from fewer components than prior art pilot devices, and positively prevents the stock strip from sticking to the pilot. The pilot body itself provides the precise location of the stripper assembly in an associated die pad at a location close to the stock strip. The stripper assembly has a modular design that can be economically manufactured, a small profile and footprint, and can be easily assembled and disassembled from an associated die member. Due to the design of the pilot assembly, the ejector pins can be located in close proximity to the pilot pin, so as to positively and dependably, repeatedly strip the stock strip from the pilot pin. The pilot assembly has a single screw mounting system for quick and easy installation in an associated die member. The pilot can be machined from a single piece of solid material in one setup to achieve tighter tolerances and better concentricity between the pilot body and the pilot point, as well as reduced manufacturing costs. The pilot assembly is efficient in use, economical to manufacture, capable of a long operating life, and particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 1 is a perspective view of a modular pilot assembly with self-contained stripper embodying the present invention, shown installed in a die set carrying a stock strip in which pilot holes have been formed.

FIG. 2 is an exploded perspective view of the pilot assembly shown in FIG. 1.

FIG. 3 is a perspective view of a portion of the pilot assembly in an assembled condition, taken from an outer end thereof.

FIG. 3A is a vertical cross-sectional view of the portion of the pilot assembly shown in

FIG. 3.

FIG. 4 is a top plan view of the pilot assembly.

FIG. 15 is a top plan view of an ejector pin portion of the pilot assembly.

FIG. 16 is a side elevational view of the ejector pin.

FIG. 17 is a bottom plan view of the ejector pin.

FIG. 18 is a top plan view of a mounting screw portion of the pilot assembly.

FIG. 19 is a side elevational view of the mounting screw.

FIG. 20 is a bottom plan view of the mounting screw.

FIG. 21 is a top plan view of a lock washer portion of the pilot assembly.

FIG. 22 is a vertical cross-sectional view of the lock washer.

FIG. 23 is a bottom plan view of the lock washer.

FIG. 24 is a side elevational view of the pilot shown mounted in a die member, wherein the outer end of the pilot is partially inserted into the pilot aperture of an associated stock strip.

FIG. 25 is a side elevational view of the pilot shown mounted in a die member, wherein the outer end of the pilot is fully inserted into the pilot aperture in the stock strip.

FIG. 26 is a side elevational view of the pilot assembly shown mounted in a die member, wherein the pilot and upper die member have been diverged from the stock strip and the lower die member.

FIG. 27 is a plan view of an upper pressure pad portion of the die oriented with the normally lower mounting face oriented upwardly for illustration purposes, that has been machined for installation of the pilot assembly therein.

FIG. 28 is a perspective, cross-sectional view of the die member of FIG. 27, taken along the line XXVIII-XXVIII.

FIG. 29 is an exploded, perspective view of the pilot assembly prior to installation into the normally lower mounting face of the machined upper die pressure pad of FIGS. 27 and 28.

FIG. 30 is an exploded, perspective view of the pilot installed in the normally lower mounting face of the upper pressure pad die member of FIGS. 27-29, with the mounting screw and lock washer shown uninstalled.

FIG. 31 is a perspective view of the pilot assembly shown completely installed in the normally lower mounting face of the upper pressure pad die member of FIGS. 27-30.

DETAILED DESCRIPTION OF THE PREFERRED EMBODIMENTS

Figure 5:
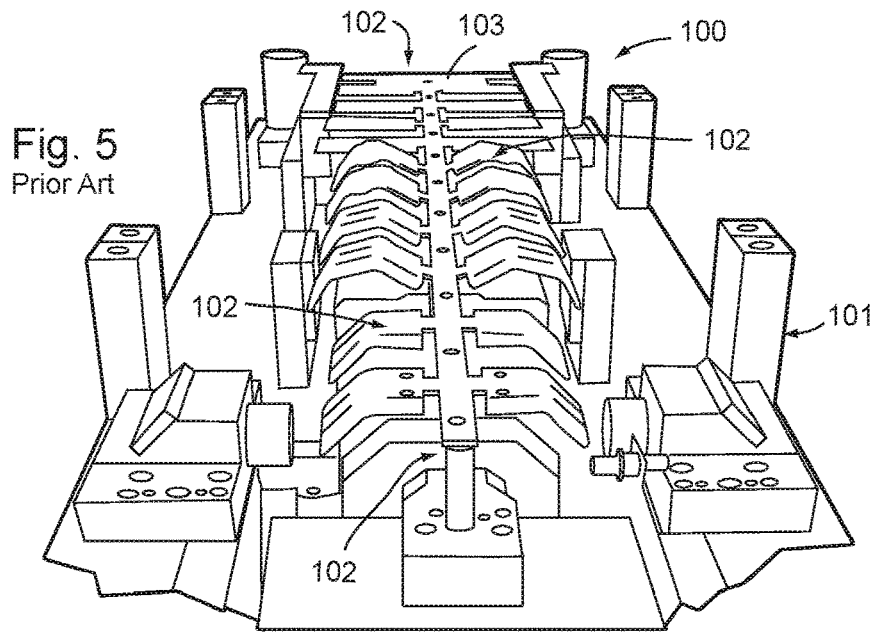
FIG. 5 is a partially schematic perspective view of a representative, prior art die member shown in an open condition with a stock strip positioned along the various work stations of the die member.
Figure 6:
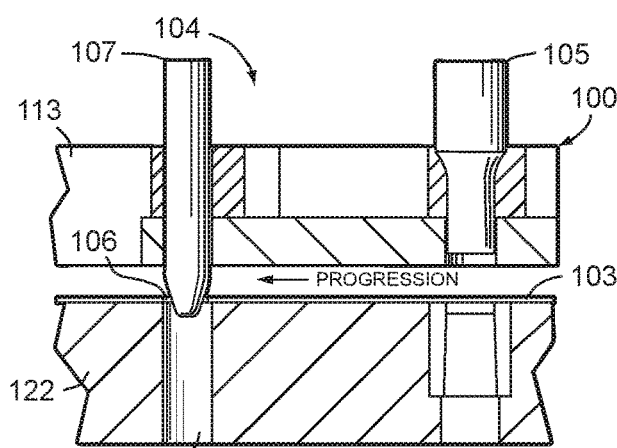
FIG. 6 is a partially schematic cross-sectional view of a prior art pilot assembly.
Figure 7:
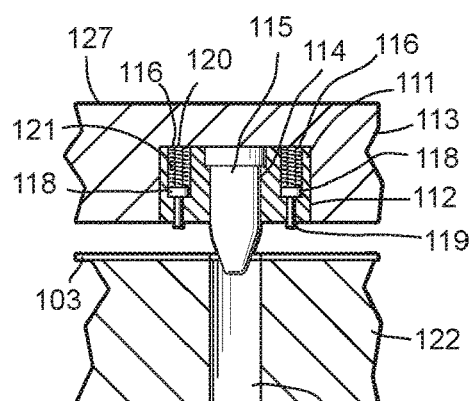
FIG. 7 is a partially schematic cross-sectional view of another prior art pilot assembly.
Figure 8:
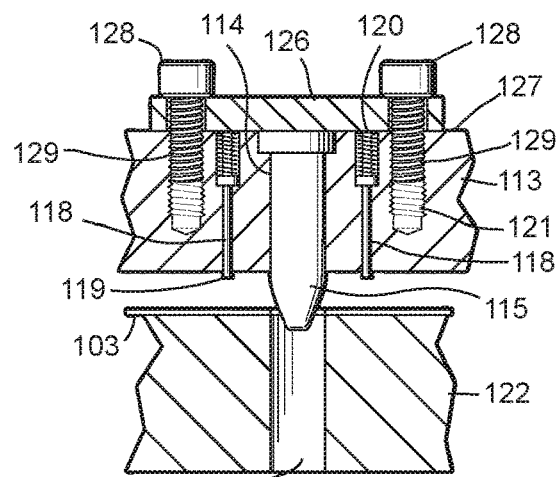
FIG. 8 is a partially schematic cross-sectional view of yet another prior art pilot assembly.
Figure 9:
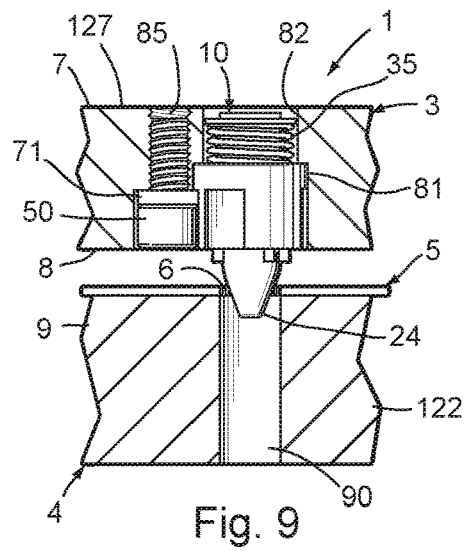
FIG. 9 is a cross-sectional view of the pilot assembly embodying the present invention, shown installed in a die set.
Figure 10:
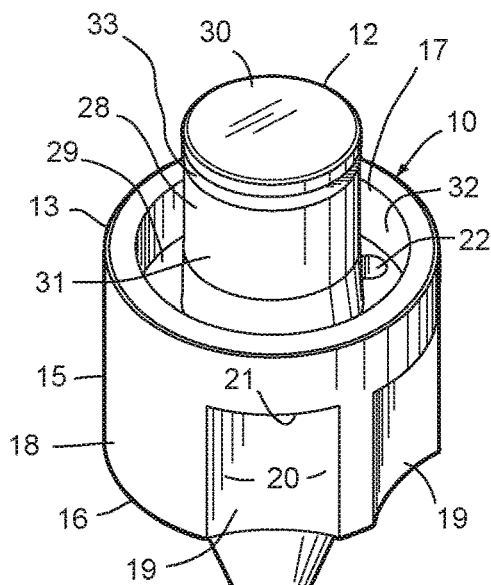
FIG. 10 is a perspective view of a pilot portion of the pilot assembly, taken from an inner end thereof.
Figure 11:
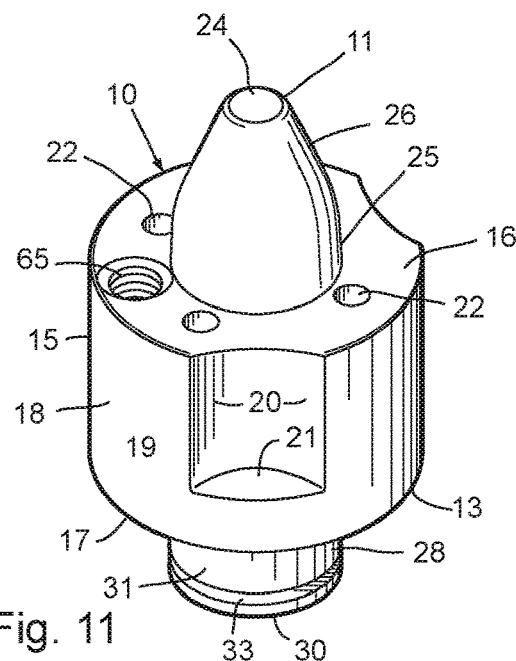
FIG. 11 is a perspective view of the pilot, taken from an outer end thereof.

For purposes of description herein, the terms "upper," "lower," "right," "left," "rear," "front," "vertical," "horizontal" and derivatives thereof shall relate to the invention as oriented in FIGS. 1, 2 and 3A. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1-4) generally designates a modular pilot assembly with self-contained stripper embodying the present invention. As shown in FIG. 1, the pilot assembly 1 is particularly adapted for use in conjunction with a multi-station progressive metal forming die 2 having at least two mutually converging and diverging die members 3 and 4 between which an elongate stock strip 5 is shifted longitudinally to form parts from the stock strip. The pilot assembly 1 includes a pilot 10 configured for operable support on one of the two die members 3, 4 having an outer end 11 oriented toward the stock strip 5, an oppositely disposed inner end 12 oriented away from the stock strip 5, and a medial portion 13 disposed axially between the outer and inner ends 11, 12. A generally cylindrically shaped body portion 15 is disposed at the medial portion 13 of pilot 10, and has a generally closed outer end 16 oriented toward the stock strip 5, a generally open inner end 17 oriented away from the stock strip 5, and an outer sidewall 18 with at least one fastener relief 19 that has an arcuately shaped, radially inwardly curved relief sidewall 20 that extends from the closed outer end 16 to a generally flat, arcuately shaped relief end surface 21 facing toward the stock strip 5 and spaced axially a predetermined distance from the open inner end 17. The body portion 15 also has at least one axially extending ejector pin aperture 22 which opens through the closed outer end 16 and into the open inner end 17. The pilot 10 also has a generally tapered point portion 24 at the outer end 11 of the pilot 10, having a circularly shaped innermost collar portion 25 disposed adjacent the closed outer end 16 of body portion 15 that is shaped for close reception in a pilot hole 6 in the stock strip 5, and a generally frusto-conically shaped outer portion or nose 26 configured to engage the pilot hole 6 in the stock strip 5 and guide the same to a predetermined position in an associated die forming station 12 of metal forming die 2. Pilot 10 also has a cylindrically shaped spring retainer rod portion 28 disposed at the inner end 12 of the pilot 10, having an outer end 29 oriented toward the stock strip 5, an inner end 30 oriented away from the stock strip 5, and an outer sidewall 31 with a diameter that is less than the diameter of the outer sidewall 18 of the body portion 15, thereby forming an annularly shaped spring groove 32 (FIGS. 1 and 3A) adjacent the outer end 29 of spring retainer rod portion 28, as well as a retainer groove 33 positioned adjacent the inner end 30 of the spring retainer rod portion. Pilot assembly 1 also includes a spring member 35 having a generally hollow interior 36 received on and over the spring retainer rod portion 28 of the pilot 10, an outer end 37 oriented toward stock strip 5 and received in the spring groove 32, and an opposite inner end 38 oriented away from the stock strip 5 and positioned adjacent to the retainer groove 33 in the spring retainer rod portion 28, when in at least a partially assembled condition. The pilot assembly 1 also includes at least one rigid ejector pin 42 slidingly received and retained in the ejector pin aperture 22 in the body portion 15 of the pilot 10, and having an outer end 43 that protrudes outwardly from the closed outer end 16 of body portion 15 when urged to an extended condition, as shown in FIGS. 3 and 3A, to abut the stock strip 5 and strip the same from the pilot 10, and retracts toward the body portion 15 when urged to a retracted position, as shown in FIG. 25, and an inner end 44 that operably engages the outer end 37 of spring member 38 and is thereby biased outwardly by the spring member 35 toward the extended condition. The pilot assembly 1 also includes a retainer ring 47 detachably received in the retainer groove 33 in the spring retainer rod portion 28 and engaging the inner end 38 of the spring member 35 in a pre-tensed condition to bias the ejector pin 42 toward the extended condition. The pilot assembly also includes a mounting screw 50 having an enlarged head portion 51 with a circular plan shape that is at least partially, closely received in the fastener relief 19 in the body portion 15 of the pilot 10, an annularly shaped inner face 52 oriented away from the stock strip 5 and abuttingly engaging the relief end surface 21 of the fastener relief 19 in the body portion 15 of pilot 10, and a threaded shank portion 53 configured for anchoring in an associated die member 3, 4 to securely, yet detachably mount the pilot assembly 1 on the associated die member in a manner which causes the ejector pin 42 to automatically reciprocate between the retracted and extended positions relative to the body portion 15 of the pilot 10 during operation of the metal forming die to ensure that the stock strip 5 is consistently and fully stripped away from the pilot 10.

The term "die member," as used herein, refers to any portion of a metal forming die or die set, including, but not limited to, an upper die member or die shoe, a lower die member, and all other die components, whether stationary or reciprocating, including a reciprocating pressure pad, or the like. In the illustrated examples, the pilot assembly 1 is shown mounted in a reciprocating upper die pad 3 located above a lower stationary die shoe 4. However, as will be appreciated by those skilled in the art, pilot assembly 1 can be mounted in other types of die members and/or components in a variety of different positions and orientations, as necessary to precisely locate the stock strip 5 in the various workstations 102 of a metal forming die 100.

The illustrated pilot 10 (FIGS. 10-14) has a one-piece construction formed from a solid bar of rigid material, such as metal or the like. In the illustrated pilot 10, the point portion 24 of pilot 10 is located concentric with body portion 15 and spring retainer rod portion 28. Furthermore, the body portion 15 of the pilot 10 includes a plurality of fastener reliefs 19 having a substantially identical configuration and arranged in a circumferentially spaced apart pattern around the outer sidewall 18 of the body portion 15 of pilot 10 to facilitate mounting the pilot assembly 1 at various locations and orientations on one or more of the die members 3, 4. As best illustrated in FIG. 4, the illustrated body portion 15 of pilot 10 includes three fastener reliefs 19, two of which are disposed generally diametrically opposite one another, and the third of which is oriented at an angle of approximately 30°-40° from the fastener relief in which the mounting screw 50 is received in the illustration of FIG. 4.

Figure 12:
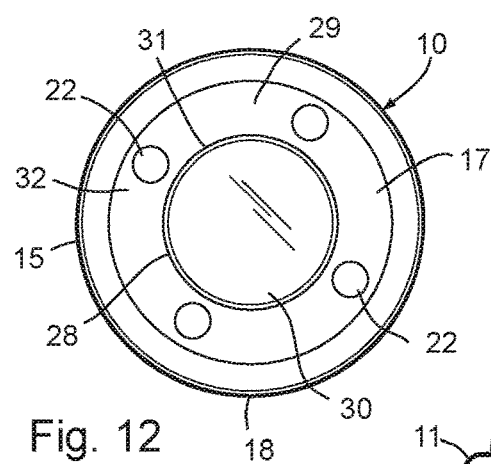
FIG. 12 is a plan view of the inner end of the pilot.
Figure 13:
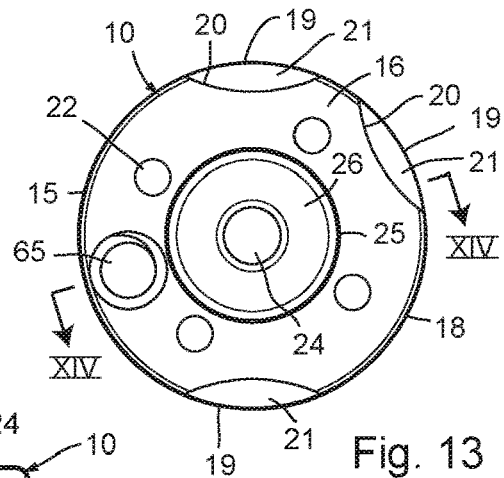
FIG. 13 is a plan view of the outer end of the pilot.
Figure 14:
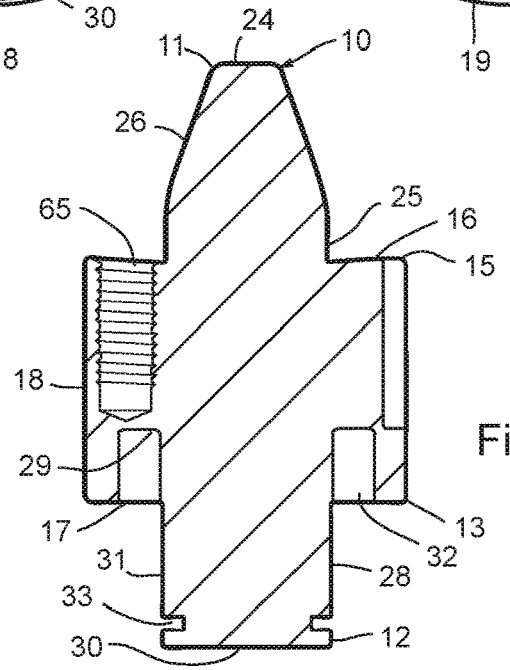
FIG. 14 is a vertical cross-sectional view of the pilot.

Since the illustrated pilot 10 (FIGS. 10-14) has a one-piece construction formed from a solid bar of rigid material, such as metal or the like, preferably, all machining operations on the solid bar of rigid material are made during a single machine set-up, so as to achieve greater accuracy and consistency of the pilot 10, as well as reduced manufacturing costs. The body portion 15 of the illustrated pilot 10 has a plurality of ejector pin apertures 22 having a substantially identical configuration and arranged in a circumferentially spaced apart, mutually parallel, axially extending pattern through the body portion 15 to ensure effective and consistent stripping of the stock strip 5 from the pilot 10. As best shown in FIGS. 4, 12 and 13, the illustrated pilot 10 includes four ejector pin apertures 22 which are spaced opposite from one another on the closed outer end 16 of pilot body portion 15, and are radially positioned close to the collar portion 25 of pilot 10, so as to improve the stripping action of the same. The illustrated pilot 10 also includes four substantially identical ejector pins 42 which are slidingly received and retained for reciprocation in the ejector pin apertures 22 of body portion 15. As best illustrated in FIGS. 15-17, the outer ends 43 of ejector pins 42 have a size and shape similar to the elongate body portions of ejector pins 42, each with a flat circular plan configuration best suited for abuttingly engaging the strip stock 5, while the inner ends 44 of ejector pins 42 are enlarged relative to the size of the elongate body portions of ejector pins 42, and define cylindrically shaped, enlarged heads, each with a generally circular, flat inner face which facilitates engagement with the outer end 37 of spring member 35. With reference to FIGS. 4 and 14, the body portion 15 of the illustrated pilot 10 includes a threaded blind installation aperture 65 which extends axially into the closed outer end 16 of the body portion 15 of pilot 10 at a location spaced radially outwardly from and circumferentially inbetween the ejector pin apertures 22. A puller tool 66, shown schematically in FIG. 31, is configured for threaded engagement in the blind installation aperture 65 in pilot body portion 15 to facilitate removal of the assembled pilot 10 from the associated die member 3, 4, as discussed in greater detail below. Installation aperture 65 is disposed generally opposite the three fastener reliefs 19 in pilot 1, as best shown in FIG. 4.

The illustrated spring member 35 comprises a conventional closed coil spring, which may have partially flattened ground ends 37, 38 to more securely abut the inner ends 44 of ejector pins 42, as well as the retainer ring 47 mounted in the retainer groove 33 at the inner end 30 of spring retainer rod portion 28. The illustrated retainer ring 47 comprises a conventional snap ring that is securely, yet detachably received and retained in retainer ring groove 33.

With reference to FIGS. 18-20, the illustrated mounting screw 50 comprises a conventional socket head cap screw having a tool engaging socket 68 in the outer face 54 of the head portion 51 of mounting screw 50, opposite inner face 52, and the threaded shank portion 53 includes a self-locking nylon patch 69, which prevents mounting screw 50 from inadvertently loosening from its tightened condition in the die member 3, 4.

In the illustrated example, a lock washer 71 (FIGS. 21-23) is positioned over the threaded shank portion 53 of mounting screw 50, and further ensures that the mounting screw 50 will not become inadvertently loosened during operation of the metal forming die. The illustrated lock washer 71 is a conventional split, high-collar washer having a generally annular plan configuration with an outer face 72 abuttingly engaging the inner face 52 of the head portion 51 of mounting screw 50, and an inner face 73 engaging the relief end surface 21 of the fastener relief 19 on pilot body portion 15. Mounting screw 50 constitutes a single mounting screw system, configured for at least partial reception in and engagement with any one of the three fastener reliefs 19 in the body portion 15 of pilot 10, which provides the sole support for mounting the body portion 15 of pilot 10 in the die member 3,4, with a compact profile and footprint that facilitates ease of die design, operation and maintenance. The single mounting screw attachment of pilot 10 to die member 3 also provides quick and easy installation and removal. As will be appreciated by those skilled in the art, pilot assembly 1 can be used either with or without lock washer 71.

Pilot 10 is assembled by inserting four ejector pins 42 into the associated ejector pin holes 44 in the body portion 15 of pilot 10 with the enlarged circular outer ends or heads 44 oriented away from the stock strip 5. The spring member 35 is then inserted over the spring retainer rod portion of pilot 10, and into the spring groove 32, such that the outer end 37 of the spring member 35 abuts the inner ends 44 of the ejector pins 42. Spring member 35 is then compressed to a pre-tensed state, which permits insertion of the retainer ring 47 into the retainer ring groove 33 at the inner end 30 of spring retainer rod portion 28, which contains the compressed spring member 35, and completes the assembly, such that spring member 35 biases each of the ejector pins 42 outwardly through the apertures 22 in the closed end 16 of body portion 15 to a normally fully extended position. The threaded outer end of installation tool 66 is threadedly engaged in the threaded aperture 65 in pilot body portion 15 and serves to guide the pilot 10 into pilot hole 80 in the correct orientation, as discussed in greater detail below.

With reference to FIGS. 27-31, the assembled pilot assembly 1 is quickly and easily installed in the illustrated upper die pad 3 in the following manner. The upper die pad 3 shown in FIGS. 27-31 is illustrated with the normally lower mounting face 8 oriented upwardly in a non-running condition, so as to better visualize the various pilot mounting apertures. However, as is apparent to those skilled in the art, pilot 10 is typically mounted in the lower mounting face of an upper pressure pad, or similar die component, and runs or operates in the orientation shown in FIGS. 1, 9 and 24-26. Initially, a non-threaded pilot aperture 80 is formed in the lower or mounting face 8, of the upper die member 3 using simple machining techniques and no special tooling, and is shaped to closely receive and retain the body portion 15 of the pilot 10 therein. The illustrated pilot aperture 80 has a stepped construction, with a larger diameter aperture 81 disposed closest to the stock strip 5 and lower die mounting surface 8, and a smaller diameter aperture 82 disposed furthest away from the stock strip 5 and lower die mounting surface 8, with an annular lip or collar 83 formed therebetween. The outer sidewall 18 of the body portion 15 of pilot 10 fits closely within the larger aperture 81 of the pilot hole 80, and the inner end 17 of the body portion 15 of pilot 10 engages collar 83 to axially locate pilot 10 within pilot hole 80. The spring retainer rod portion 28 of pilot 10, along with spring member 35 and retainer ring 47, are positioned in the smaller aperture 82 of the pilot hole 80. A single threaded mounting screw aperture 85 is formed in the lower or mounting face 8 of die member 3 at a location spaced laterally apart from the pilot hole 80 a predetermined distance, and is shaped to closely receive therein the shank portion 53 of mounting screw 50 and the lock washer 71. It is noteworthy that screw aperture 85 can be located at several different positions on the mounting face 8 of die member 3 to avoid interference with other die components mounted thereon, so long as it can be aligned with one of the three fastener reliefs 19 in the body portion 15 of pilot 10, as shown in FIGS. 3, 3A and 29-31. A pocket 86 having a generally U-shaped plan configuration extends between and connects the threaded screw hole 85 and the larger pilot aperture 80 along the lower mounting face 8 of the upper pressure pad 3, and is sized to receive a portion of mounting screw 50 therein. As will be appreciated by those skilled in the art, assembled pilot 10 can also be installed in an upper pressure pad or other die component machined as outlined below, with the pressure pad 3 and/or die member oriented in the run condition shown in FIGS. 1 and 19.

The assembled pilot 10 is aligned with and inserted into the pilot hole 80 in die member 3 in the manner illustrated in FIGS. 29-31. The body portion 15 of pilot 10 is rotated in pilot hole 80, so that one of three fastener reliefs 19 in the body portion 15 of pilot 10 is laterally aligned with the threaded screw aperture 85 in the mounting face 8 of die member 3, as shown in FIG. 30. Mounting screw 50, with lock washer 31 installed on the shank portion 53 of mounting screw 50, is then inserted into the threaded retainer aperture 85 in upper die pad member 3, as shown in FIGS. 30 and 31. The tightening of mounting screw 50 in the mounting screw aperture 85 in the die member 3 abuttingly engages at least a portion of the inner face 73 of the lock washer 71 on mounting screw 50 securely against the relief end surface 21 of the aligned fastener relief 19 in the body portion 15 of pilot 10, as shown in FIG. 31, to securely, yet detachably mount the pilot assembly 1 on the die member 3 in a manner which causes the ejector pins 42 to automatically reciprocate between the retracted and extended positions relative to the body portion 15 of the pilot 10 during operation of the metal forming die to ensure that the stock strip 5 is consistently and fully stripped away from the pilot 10. As will be appreciated by those skilled in the art, under special and/or abnormal conditions, multiple mounting screws 50 may be used to secure pilot 10 in die member 3. Essentially, the full cylindrical portions of the body portion 15 of pilot 10, when closely received in the pilot hole 80 of die pressure pad 3, precisely locate and support the pilot 10 in the die workstation 102, and the single mounting screw 50 securely, yet detachably retains the pilot assembly 1 in pilot hole 80.

The pilot 10 and related pilot assembly 1 may be readily removed from die member 3 by simply reversing the sequence of the installation steps described above. In the illustrated example, a puller tool 66 (FIG. 31) is provided to facilitate safe removal and handling of the pilot 10. More specifically, puller tool 66 has a threaded outer end 66a that is threadedly engaged in the threaded aperture 65 in pilot body portion 15, and a weighted sliding handle 66b which is manually shifted outwardly along the rod shaped body of puller tool 66 to impact an enlarged head 66c, thereby imparting sufficient outwardly directed forces to easily extract pilot 10 from the pilot hole 80 in die member 3. Alternatively, pilot 10 can be removed from die member 3 by tapping it out of pilot hole 80 with a punch and hammer applied from the outer end of pilot 10.

FIGS. 24-26 illustrate the operation of the pilot assembly 1, wherein FIG. 24 illustrates the upper die member 3 with pilot 10 mounted therein converging against the stock strip 5 that is supported on the upper surface 9 of the lower die member 4. In this position, the ejector pins 42 are fully extended, and just start to abut against the upper surface of the stock strip 5. The outer portion 26 of the point portion 24 of pilot 10 is received through the most closely aligned one of the pilot holes 6 in stock strip 5 and into the female pilot portion 90 in the bottom or lower die member 4, but the collar portion of pilot 10 is not. Next, the upper die member 3 converges or closes completely against the stock strip 5 and lower die member 4 supporting the same in the manner illustrated in FIG. 25, such that the abutting contact between the outer ends 43 of the ejector pins 42 and the upper surface of the stock strip 5 overcomes the biasing force of pre-tensed spring member 35 on ejector pins 42, further compresses spring member 35, and shifts or retracts the ejector pins 42 back toward the interior of the body portion 15 of pilot 10. As shown in FIG. 25, the collar portion 25 of the point portion 24 of pilot 10 is now fully received in the female pilot portion 90 of bottom die member 4. The metal forming operation at the associated die work station 12 is then completed with the pilot assembly 1 in the position shown in FIG. 25, such that the stock strip 5 is precisely located and securely held in place during formation and further processing of stock strip 5. As the upper die member 3 diverges or moves away from the stock strip 5 and lower die member 4, the resilient forces generated by spring member 35 urge the ejector pins 42 back outwardly toward the stock strip 5 and separate or strip the stock strip 5 from the pilot, even when it sticks on the outer surfaces of the nose portion of the pilot 10, such that the stock strip 5 can then be quickly shifted longitudinally to the next work station 12 for further processing.

It is also possible to mount pilot assembly 1 in an associated die member by forming a blind hole pocket in the die member, instead of the through hole mounting aperture 80, as best shown in FIGS. 27-31. The assembled pilot 10 is inserted into the blind hole pocket and retained therein using a single fastener in the manner disclosed in detail in Applicant's related U.S. application Ser. No. 13/545,226, filed Jul. 10, 2012, entitled MODULAR PILOT ASSEMBLY WITH SELF-CONTAINED STRIPPER AND METHOD FOR METAL FORMING DIES, which is incorporated herein by reference. With this alternate mounting arrangement, the retainer groove 33 on pilot 10 and retainer ring 47 can be eliminated by using the blind bottom surface of the pocket to retain an inner end of the spring member 35, as will be appreciated by those skilled in the art.

As will be appreciated by those skilled in the art, pilot assembly 1 can be provided in a wide variety of sizes to accommodate many different metal forming die applications. The all-in-one, modular construction of pilot assembly 1 not only provides a self-contained stock stripper that uses only one spring, but can be quickly and easily installed directly in a die member using simple machining techniques, and a single mounting screw.

Pilot assembly 1 has an uncomplicated construction with relatively few components and is therefore quite durable and economical to manufacture. The single mounting screw attachment of the pilot assembly to an associated die member provides quick and easy installation and removal. Pilot assembly 1 has a self-contained stripper which positively separates the stock strip from the pilot during operation of the metal forming die, and provides a very compact, low profile shape that can be used at various locations and orientations on the various die members. The installation of the pilot assembly 1 can be achieved with simple machining, so as to reduce installation time and cost.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a multi-station progressive metal forming die having at least two mutually converging and diverging die members between which an elongate stock strip is shifted longitudinally to form parts from the stock strip, the improvement of a modular pilot assembly with self-contained stripper, comprising:

a pilot operably supported on one of said die members and having an outer end oriented toward the stock strip, an oppositely disposed inner end oriented away from the stock strip, and a medial portion disposed axially between said outer and inner ends, and including:
a body portion having an outer end oriented toward the stock strip, an inner end oriented away from the stock strip, and an outer wall with a least one fastener relief therein, as well as at least one axially extending ejector pin aperture which opens through said outer end and into said inner end;
a point portion disposed at said outer end of said pilot shaped for close reception in a pilot hole in the stock strip, and an outer portion configured to engage the pilot hole in the stock strip and guide the same to a predetermined position in an associated die forming station;
a spring retainer portion disposed at said inner end of said pilot, having an outer end oriented toward the stock strip, an inner end oriented away from the stock strip, and an annularly shaped spring groove adjacent said outer end of said spring retainer portion;
a spring member that is received onto and over said spring retainer portion of said pilot, an outer end oriented toward the stock strip and received in said spring groove, and an opposite inner end oriented away from the stock strip and positioned adjacent to said retainer groove in said spring retainer portion;

at least one rigid ejector pin slidingly received and retained in said ejector pin aperture in said body portion, having an outer end that protrudes outwardly from said outer end of said body portion when urged to an extended condition to contact the stock strip and strip the same away from said pilot, and retracts toward the body portion when urged to a retracted position, and an inner end that operably engages said outer end of said spring member and is thereby biased outwardly by said spring member toward said extended condition;

a retainer ring detachably received on said spring retainer portion and engaging said inner end of said spring member in a pre-tensed condition to bias said ejector pin toward said extended condition; and a mounting fastener having an enlarged head portion that is at least partially, closely received in said fastener relief in said body portion, and a shank portion anchored in said one die member to securely mount said pilot assembly on said one die member in a manner which causes said ejector pin to automatically reciprocate between said retracted and extended positions relative to said body portion of said pilot during operation of said metal forming die to ensure that the stock strip is consistently stripped away from said pilot.

2. A metal forming die as set forth in claim 1, including:
a retainer groove disposed adjacent said inner end of said spring retainer portion.

3. A metal forming die as set forth in claim 2, wherein:
said retainer ring is detachably received in said retainer groove.

4. A metal forming die as set forth in claim 1, wherein:
said pilot has a one-piece construction formed from a solid bar of rigid material.

5. A metal forming die as set forth in claim 4, wherein:
said body portion of said pilot includes a plurality of said ejector pin apertures having a substantially identical configuration and arranged in a spaced apart pattern through said body portion to ensure effective stripping of the stock strip from said pilot; and including a plurality of said ejector pins having a substantially identical configuration and slidingly received and retained in said ejector pin apertures in said body portion of said pilot.

6. A metal forming die as set forth in claim 5, wherein:
said body portion of said pilot includes a plurality of said fastener reliefs having a substantially identical configuration and arranged in a spaced apart pattern around said outer wall of said body portion to facilitate mounting said pilot assembly at various locations and orientations on said one die member.

7. A metal forming die as set forth in claim 1, wherein:
said mounting fastener is a threaded screw.

8. A metal forming die as set forth in claim 1, wherein:
said body portion having a generally cylindrical shape.

9. A modular pilot assembly with self-contained stripper for multi-station progressive metal forming dies having at least two mutually converging and diverging die members between which an elongate stock strip is shifted longitudinally to form parts from the stock strip, comprising:

a pilot configured for operable support on an associated die member, and having an outer end oriented toward the stock strip, an oppositely disposed inner end oriented away from the stock strip, and a medial portion disposed axially between said outer and inner ends, and including:

a body portion having an outer end oriented toward the stock strip, an inner end oriented away from the stock strip, and an outer sidewall with at least one fastener relief therein, as well as at least one axially extending ejector pin aperture which opens through said outer end and into said inner end;

a point portion disposed at said end of said pilot shaped for close reception in a pilot hole in the stock strip, and an outer portion configured to engage the pilot hole in the stock strip and guide the same to a predetermined position in an associated die forming station;

a spring retainer portion disposed at said inner end of said pilot, having an outer end oriented toward the stock strip, an inner end oriented away from the stock strip, and an annularly shaped spring groove adjacent said outer end of said spring retainer portion;

a spring member received on and over said spring retainer portion of said pilot, an outer end oriented toward the stock strip and received in said spring groove, and an opposite inner end oriented away from the stock strip and positioned adjacent to said retainer groove in said spring retainer portion;

at least one rigid ejector pin slidingly received and retained in said ejector pin aperture in said body portion, having an outer end that protrudes outwardly from said outer end of said body portion when urged to an extended condition to abut the stock strip and strip the same away from said pilot, and retracts toward the body portion when urged to a retracted position, and an inner end that operably engages said outer end of said spring member and is thereby biased outwardly by said spring member toward said extended condition;

a retainer ring detachably received on said spring retainer portion and engaging said inner end of said spring member in a pre-tensed condition to bias said ejector pin toward said extended condition; and a mounting fastener having an enlarged head portion that is at least partially, closely received in said fastener relief in said body portion, and a shank portion configured for anchoring in an associated die member to securely mount said pilot assembly on the associated die member in a manner which causes said ejector pin to automatically reciprocate between said retracted and extended positions relative to said body portion of said pilot during operation of the metal forming die to ensure that the stock strip is consistently stripped away from said pilot.

10. A modular pilot assembly as set forth in claim 9, including:
a retainer groove disposed adjacent said inner end of said spring retainer portion.

11. A modular pilot assembly as set forth in claim 10, wherein:
said retainer ring is detachably received in said retainer groove.

12. A modular pilot assembly as set forth in claim 9, wherein:
said pilot has a one-piece construction formed from a solid bar of rigid material.

13. A modular pilot assembly die as set forth in claim 12, wherein:
said body portion of said pilot includes a plurality of said ejector pin apertures having a substantially identical configuration and arranged in a spaced apart pattern through said body portion to ensure effective stripping of the stock strip from said pilot; and including a plurality of said ejector pins having a substantially identical configuration and slidingly received and retained in said ejector pin apertures in said body portion of said pilot.

14. A modular pilot assembly as set forth in claim 13, wherein:

said body portion of said pilot includes a plurality of said fastener reliefs having a substantially identical configuration and arranged in a spaced apart pattern around said outer wall of said body portion to facilitate mounting said pilot assembly at various locations and orientations on said one die member.

15. A modular pilot assembly as set forth in claim 9, wherein:

said mounting fastener is a threaded screw.

16. A modular pilot assembly as set forth in claim 9, wherein:

said body portion and said spring retainer portion having a generally cylindrical shape.

17. In a method for making a multi-station progressive metal forming die having at least two mutually converging and diverging die members between which an elongate stock strip is shifted longitudinally to form parts from the stock strip, with the improvement of at least one modular pilot with self-contained stripper for precisely locating the stock strip in the die stations, comprising:

forming a body portion with an outer end oriented toward the stock strip, an inner end oriented away from the stock strip, and an outer wall with at least one fastener relief therein, as well as at least one axially extending ejector pin aperture which opens through the outer end and into said inner end;

forming a point portion on an outer end of the pilot with a portion disposed adjacent the outer end of the body portion shaped for close reception in a pilot hole in the stock strip, and an outer portion configured to engage the pilot hole in the stock strip and guide the same to a predetermined position in an associated die forming station;

forming a spring retainer portion on an inner end of the pilot with an outer end oriented toward the stock strip, an inner end oriented away from the stock strip, and an annularly shaped spring groove adjacent the outer end of the spring retainer portion;

forming at least one rigid ejector pin with an inner end, and an outer end configured to protrude outwardly from the outer end of the body portion when urged to an extended position to contact the stock strip, and to retract toward the body portion when urged to a retracted position;

inserting the ejector pin into the ejector pin aperture in the body portion of the pilot, such that the ejector pin is slidingly received and retained in the ejector pin aperture for longitudinal reciprocation therein between the extended and retracted positions;

selecting a spring member with a generally hollow interior, an outer end oriented toward the stock strip, and an opposite inner end oriented away from the stock strip;

positioning the hollow interior of the spring member onto and over the spring retainer portion of the pilot, with the outer end of the spring member received in the spring groove and abutting the inner end of the ejector pin, and the inner end of the spring member positioned adjacent to the retainer groove in the spring retainer portion;

shifting the inner end of the spring member outwardly along the spring retainer portion of the pilot to compress the spring member to a pre-tensed condition, such that the outer end of the spring member operably engages the inner end of the ejector pin and biases the ejector pin to the extended position;

installing a retainer ring on the spring retainer portion with the spring member in the pre-tensed condition, such that the retainer ring abuttingly engages the inner end of the spring member and retains the spring member in the pre-tensed condition on the spring retainer portion of the pilot, thereby resiliently urging the ejector pin to the normally extended position;

forming a non-threaded pilot aperture in a mounting face of one of the die members with a shape to closely receive and retain the body portion of the pilot therein;

forming a threaded mounting fastener aperture in the mounting face of the one die member at a location spaced laterally apart from the pilot aperture a predetermined distance;

inserting the pilot into the pilot aperture in the one die member with the outer sidewall of the body portion of the pilot closely received therein, and with the fastener relief in the body portion of the pilot facing and aligned with the mounting fastener aperture in the one die member, so as to accurately locate the pilot on the one die member;

selecting a mounting fastener having an enlarged head portion sized for at least a portion thereof to be closely received in the fastener relief in said body portion of the pilot, and a threaded shank portion;

inserting the threaded shank portion of the mounting fastener axially into the mounting fastener aperture in the mounting face of the one die member, such that at least a portion of the enlarged head portion of the mounting fastener is closely received in the fastener relief and adjacent a portion of the sidewall of the fastener relief on the body portion of the pilot; and tightening the mounting fastener in the mounting fastener aperture in the one die member, thereby abuttingly engaging at least a portion of the mounting fastener head portion securely against a portion of the fastener relief in the body portion of the pilot to securely, yet detachably mount the pilot assembly on the one die member in a manner which causes the ejector pin to automatically reciprocate between the retracted and extended positions relative to the body portion of the pilot during operation of the metal forming die to ensure that the stock strip is consistently stripped away from the pilot.

18. A method as set forth in claim 17, wherein:

said retainer forming step includes forming a retainer groove disposed adjacent the inner end of the spring retainer portion.

19. A method as set forth in claim 18, wherein:

said retainer ring installation step includes installing the retainer ring in the retainer groove.

20. A method as set forth in claim 17, wherein:

said mounting fastener selecting step comprises selecting a threaded screw.

* * * * *